United States Patent [19]

Geittner et al.

[11] Patent Number: 4,857,091
[45] Date of Patent: Aug. 15, 1989

[54] METHOD OF MANUFACTURING OPTICAL FIBERS

[75] Inventors: Peter E. E. Geittner, Aachen; Hans-Jürgen Lydtin, Stolberg; Howard J. C. Wilson, Aachen, all of Fed. Rep. of Germany

[73] Assignee: U.S. Philips Corp., New York, N.Y.

[21] Appl. No.: 106,839

[22] Filed: Oct. 8, 1987

[30] Foreign Application Priority Data

Oct. 15, 1986 [DE] Fed. Rep. of Germany ....... 3635034

[51] Int. Cl.$^4$ ........................................... C03B 37/018
[52] U.S. Cl. ........................................... 65/3.12; 65/2; 65/13; 427/163
[58] Field of Search ............... 65/3.11, 3.12, 30.1, 65/2, 13; 427/163

[56] References Cited

U.S. PATENT DOCUMENTS 3,980,459  9/1976  Li .................................. 65/30.1 X
3,982,916  9/1976  Miller ............................. 65/30.1 X
4,417,911  11/1983  Cundy et al. ..................... 65/3.12
4,741,747  5/1988  Geittner et al. ................... 65/3.12

FOREIGN PATENT DOCUMENTS

0209945  1/1987  European Pat. Off. ............. 65/3.12
2079267  1/1982  United Kingdom ................ 65/3.12
2164642  7/1984  United Kingdom ................ 65/3.12

*Primary Examiner*—Robert L. Lindsay
*Attorney, Agent, or Firm*—Ernestine C. Bartlett

[57] ABSTRACT

Optical fibres whose refractive index profiles show specific peripheral and/or radial and/or axial optical modulation structures are manufactured according to the PCVD method, in which such method parameters are varied which influence:
(a) the uniformity of the material transport to the inner wall of the tube and/or the deposition yields of the glass over the tube circumference and/or
(b) the axial position of the local deposition zone with respect to the reactor producing the plasma.

15 Claims, 2 Drawing Sheets

METHOD OF MANUFACTURING OPTICAL FIBERS

FIELD OF THE INVENTION

The invention relates to a method of manufacturing optical fibres whose refractive index profiles comprise specific peripheral and/or radial and/or axial optical modulation structures, by coating the inside of a glass tube with glass by chemical deposition from the gaseous phase, in which during the coating step one or more deposition parameters are varied, collapsing the glass tube to form a rod and drawing the rod to form a fibre.

BACKGROUND OF THE INVENTION

Optical fibres whose refractive index profiles show the above-mentioned modulation structures are to be understood to mean in this connection in particular multimode fibres having a length dependence of the transmission band width corresponding approximately to the square root of the fibre length, as well as single mode fibres having polarization-maintaining properties over large fibre lengths.

When multimode fibres are used, large transmission bandwidths can be realized when the refractive index profiles thereof show an ideal previously calculable variation which is constant over the whole fibre length in particular with a view to the rotation symmetry. These requirements can only be satisfied now with any of the known manufacturing methods in a restricted way. Dependent on the process, systematic radial profile errors (dip, layer structure, etc.), rotation asymmetries and axial fluctuations occur which in practice reduce the transmission bandwidth of such graded index multimode fibres typically to less than a tenth of the theoretically possible values.

The influence of such profile errors on the transmission behaviour, however, can be reduced in that periodic modulations in radial and/or axial directions with exactly defined modulation amplitudes and modulation frequencies are impressed upon the refractive index profile. These modulations may simultaneously result in the transmission bandwidth no longer decreasing linearly but only in accordance with the square root of the fibre length (Appl. Opt. 20 (1981) 2314–2318; DE-AS No. 27 33 872).

Such a behaviour is desirable in particular in the case of transmissions over large track lengths, as will become obvious from the following example: when graded index multimode fibres are used with a bandwidth-length product of 1.2 GHz.km the overall transmission bandwidth in a system having a length of 18 km in the case of a linear dispersion characteristic, is only approximately 65 MHz. In the case of a dispersion with a square root of the fibre length dependency, however it is approximately 280 MHz. Fibres having ideal, rotation symmetrical and length-constant refractive index profiles show however an unfavourable, that is, linear, pulse broadening due to intrinsic transmission properties. Therefore impression of specific profile modulations is desirable also when the refractive index profiles are ideal. This would consequently result in an improvement of the system-transmission properties.

In the deposition according to the MCVD-, OVD and VAD methods, profile fluctuations are generally produced for reasons which are inherent to the method. These profile fluctuations influence the conductivity properties partly unfavourably, for example, in case of profile approximations with a low number of layers and partly also favourably in the desired direction, for example, in the case of helical profile modulations in the VAD process (Appl. Opt. 20 (1981) 2314–2318). The methods mentioned hereinbefore, however, have in common that the modulations automatically occur and cannot be adapted via a specific variation of deposition parameters to the theoretically required optimum modulation structures. The reasons are inherent to these methods. For example it is necessary to fuse the soot particles produced homogenously in the gaseous phase. This principally leads to large deposition areas, to a high thermal inertia, and to the necessity of a continuous rotation of the substrate tube during the deposition. These disadvantages do not occur in the deposition according to the PCVD method (see for example, U.S. Pat. Re No. 30 635 and U.S. Pat. No. 4,314,833). In particular a local delay-free deposition at low substrate temperatures of glass layers is possible even without rotating the substrate tube and without using a separate sintering step. It is known that with this method refractive index profiles with high rotational symmetry and substantially ideal radial profile variations can be manufactured, in which profile fluctuations are substantially avoided (EP-OS No. 132 011).

For certain fields of application, such as optical sensors and wide band telecommunication transmission, it is desirable to manufacture monomode fibres having profile structures which maintain the polarization condition of the transmitted light. In such profile structures the core geometry or the refractive index profile shows a marked elliptical, in general a non-rotational, form over the whole fibre length, which theoretically should lead to a suppression of the polarization dispersion otherwise occurring. The methods known so far for the manufacture of such structures via elasto optic asymmetries or subsequent change of the geometry of the deposited material (for example, in accordance with EP-OS 67 017), however, are very time-consuming and hence expensive or are only effective in a restricted way.

SUMMARY OF THE INVENTION

It is the object of the invention to provide a method which enables a specific and easy manufacture of the desired optical and/or geometrical profile modulations for multimode graded index fibres and the optical and/or geometrical asymmetries for monomode fibre structures.

According to the invention this object is achieved in that in a method of the type mentioned in the opening paragraph the internal coating is carried out according to the PCVD method in which parameters are varied which influence the uniformity of the material transport to the inner wall of the tube and/or of the deposition yields of the glass over the circumference of the tube.

In a modified embodiment of the method according to the invention the internal coating is also carried out according to the PVCD method, in which, however, those parameters are varied which influence the axial position of the local deposition zone with respect to the device producing the plasma.

Other advantageous and efficacious embodiments and modifications of the method according to the invention are described further in the disclosure which follows. In its broadest sense, the invention comprises a method of manufacturing optical fibres whose refractive index profiles comprise defined peripheral and/or radial and/or axial optical modulation structures, by coating the inside of a glass tube with glass by chemical deposition from the gaseous phase, in which during the internal coating one or more deposition parameters are varied, collapsing the glass tube to form a rod and drawing the rod to form a fibre, characterized in that the internal coating is carried out according to the PCVD method in which (a) method parameters are varied which influence the uniformity of the material transport to the inner wall of the tube and/or the deposition yields of the glass over the circumference of the tube; and/or (b) in which those parameters are varied which influence the axial position of the local deposition zone with respect to the device producing the plasma.

For example, in order to achieve peripheral optical profile modulations, a specific rotational asymmetry of the external temperature field used for heating the tube may be adjusted, the amplitude and number of profile modulations being adjusted over the tube circumference by the amplitude and the number of temperature variations in the external temperature field. Additionally, in order to reach peripheral optical and geometrical profile modulations, the tube to be coated may be provided eccentrically in a specific manner in the reactor producing the plasma, wherein the modulation amplitude is determined by the extent of eccentricity and the number of cycles of the peripheral modulations is one.

The position of the peripheral modulation structures may be varied in a specific manner over the tube circumference during the deposition by a rotary movement of the tube to be coated with the rotary movement being carried out continuously or in discrete steps in such a manner that the frequency and the cycle time, respectively, and the phase of the rotary movement are correlated in an adjusted manner with the stroke frequency and the cycle, respectively, for the deposition of a single layer and with the phase position and the position of the reactor reciprocating over the tube, different specific correlations between the rotary movement and the stroke movement being adjusted for obtaining different modulation structures.

For obtaining elliptical profile structures with polarization-maintaining properties, a temperature field may be adjusted which comprises totally two maxima and two minima over the circumference of the tube, adjacent maxima and minima being each time shifted with respect to each other over an angle $\pi/2$. Moreover, for obtaining elliptical, optical and geometrical profile structures, the rotary movement of the tube is preferably carried out in discrete steps over each time an angle $\pi$ at the reversal points of the moving reactor and the frequency $\nu_D$ of the discrete rotations is correlated with the stroke frequency $\nu_H$ of the reactor in accordance with the relationship $\nu_D=(1/N)\cdot H$, N being a positive integer and preferably chosen to be 1.

For obtaining radial non-rotationally symmetrical helix profile modulations a simple preferably very much localized deposition asymmetry is adjusted and the tube is rotated at the reversal points of the moving reactor in discrete steps at each time equal angles $\Delta\psi$ in such a manner that with the same step frequency and stroke frequency the angle of rotation $\Delta\psi$ is chosen in accordance with the relation $\Delta\psi=(2\pi/N)$, where N is an integer $>3$, which in the deposition of a total of M individual layers determines the overall number n of the radial periodic profile modulations in accordance with the relationship n=M/N.

For obtaining radial, non-rotationally symmetrical profile modulations varying periodically in the axial direction a simple peripheral deposition asymmetry is adjusted and the tube is rotated continuously and at a constant rotational frequency $\nu_R$ in such a manner that the rotational frequency is correlated with the stroke frequency $\nu_H$ in accordance with the relationship $\nu_R=(N'+(1/N)\nu_H$, where N' and N are positive integers preferably in the range $>10$ which, with an overall number of M deposited individual layers, fix the overall number n of the radial periodic profile modulations in accordance with the relation n=M/N and the number of the simultaneous periodic axial profile modulations over the whole deposition length at N'.

The parameters which influence the axial position of the local deposition zone with respect to the device producing the plasma may include: (i) electric microwave power coupled into the plasma in the reactor area temporarily varied periodically; (ii) the pressure in the tube temporarily varied periodically; (iii) the stroke velocity of the reactor reciprocated over the tube temporarily varied periodically; (iv) the oxygen carrier gas flux temporarily varied periodically, and/or (v) the reactive gas flows temporarily varied periodically. The temporarily periodic variation of one or more of the indicated deposition parameters is carried out so that the frequency and the phase position of the modulation of the deposition parameters are correlated in a previously adjusted manner with the stroke frequency and the phase position and the position of the reactor reciprocated over the tube, respectively, in which for achieving various modulation structures various defined correlations are adjusted between modulation frequency of the deposition frequency and the stroke frequency of the reactor. When so carried out, the modulation amplitudes for the deposition parameters are adjusted so that the resulting amplitudes $\Delta Z_{mod}$ of the shift of the local deposition zone with respect to the reactor satisfies the condition $0</\Delta Z_{mod}/<\frac{1}{2}/\Delta Z_p/$ in which $/\Delta Z_p/$ is the path covered by the reactor in the space of a full modulation cycle over the tube and $/\Delta Z_{mod}/$ preferably satisfies the condition $/\Delta Z_{mod}/=\frac{1}{4}/\Delta Z_p/$.

For obtaining rotationally symmetrical profile structures unmodulated in the radial direction and optically and geometrically periodically modulated in the axial direction the correlation between modulation frequency for the relevant deposition parameters, $\nu_M$ and stroke frequency $\nu_H$ for the number of strokes over the tube is adjusted according to the relation $\nu_M=N'\cdot\nu_H$, where the phase position of the modulation to the reversal points is shifted by $\pi/2$ against that of the reactor stroke so that there a modulation maximum or minimum occurs and N' is a positive integer simultaneously indicating the number of the periodic axial profile modulations over the whole deposition length.

For obtaining rotationally symmetrical, radially and axially simultaneously modulated profile structures the correlation between modulation frequency $\nu_M$ for the relevant deposition parameter and stroke frequency $\nu_H$ for the number of individual strokes is adjusted according to the relationship $\nu_M=(N'+(1/N)\cdot\nu_H$, where N' and N are positive integers preferably in the range $>10$ which, with a number of M of totally deposited layers, fix the overall number n of the radial periodic profile modulations in accordance with the relationship n=M/N and the number of the simultaneously produced axial profile modulations over the whole deposition length at N'.

For example, in the first-mentioned embodiment of the method according to the invention a directed deposition asymmetry of $SiO_2$ and doping material over the circumference, i.e. at a given angle can be achieved in particular by adjusting a specific outer rotational asymmetry of the temperature distribution and/or a non-centric arrangement of the substrate tube in the plasma reactor. The deposition of said asymmetry can thus be varied discretely or continuously by a rotary movement of the substrate tube during the deposition layer by layer of the deposited material, which finally leads to the desired modulations or asymmetries of the geometry and/or of the refractive index profile. The number of modulations in the radial direction can be adjusted substantially via the ratio of rotational frequency to stroke frequency, the amplitude of the modulations via the extent of the impressed outer temperature asymmetry or of the decentering of the tube, and the structure of the modulations via the nature of the rotary movement (discretely or continuously). A discrete rotation of the substrate tube about angular segments $\Delta\psi$ per stroke leads to profile modulations in the radial direction which are constant throughout the coating length, whereas a continuous rotation of the tube generally produces radial modulations whose amplitude varies over the coating length. Advantageous in this connection is the fact that in the deposition according to the PCVD method the substrate tube must not be necessarily rotated and in addition a larger number of discrete layers of core material can be deposited as compared with other methods, a free choice of the type of rotation and the number of profile modulations over the core area being possible in the radial and axial directions.

Axial profile modulations and/or geometric periodic fluctuations can be manufactured according to the above-mentioned modified embodiment of the method according to the invention in that during the deposition the power of the microwave generator and/or the pressure at the deposition site are varied periodically. Here the fact is used that both the position, that is the site of the instantaneous deposition zone, and the deposition yields for doping and $SiO_2$ carrier material, depend on the plasma power and on the pressure. The number of modulations in the axial direction can be adjusted substantially via the ratio of modulation frequency to stroke frequency and the modulation amplitude via the strength of the modulation of the microwave power and/or pressure. Advantageously, in providing purely axial profile modulations the outer temperature field or the rotary movement is to be chosen to be such that no additional radial modulations are produced. When the modulation frequency is chosen to be such that it amounts to an integer multiple of the stroke frequency, purely axial profile modulations and/or geometric fluctuations of a fixed period length are produced. When the modulation frequency for plasma power or pressure is chosen to be such that it deviates slightly from a whole multiple of the stroke frequency, geometric modulations throughout the length are averaged. In this case, however, axially variable modulations of the optical refractive index profile in the radial direction occur.

By means of the method according to the invention, desired polarization-maintaining monomode power structures having a strong optical and/or geometrical ellipticity of the core area can further be manufactured in that while impressing a maximum deposition asymmetry, the substrate tube during the deposition is rotated discretely layer by layer about angles which are a whole fraction of a complete rotation. In particular with a discrete angular rotation of $\pi$ per layer the desired optical and/or geometrical core ellipticity which is constant over the full length of the deposition zone is reached in this manner. A further possibility of reaching such elliptical structures consists according to the method of the invention in that the deposition occurs without a rotary movement in which, however, the temperature profile impressed from the outside is formed so that on oppositely located sides of the substrate tube an improved deposition yield is enforced, for example by local cooling. In this case also, elliptical profile structure which are constant throughout the length are obtained.

Summarizing, the method according to the invention can be divided into various groups of combinations of specific pre-adjusted modulations of the deposition parameters with rotary movements as the case may be, in which with the various combinations various types of profile modulations can be produced. In detail, the following combinations and profile modulations resulting therefrom are possible:

A. Without a rotary movement of the substrate tube:
  (a) with fixed axially constant temperature asymmetry $T(\psi)$ impressed from the outside results in:
    1. rotationally asymmetric profiles and/or core geometries which are constant over the preform length Z
    2. elliptical profiles for monomode applications in double assymmetry for $T(\psi)$ at $\psi/\psi+\pi$
  (b) with periodic pressure modulation $p=f(t)$ and/or plasma power modulation $P_{MW}f(t)$ results in:
    1. periodic optical and/or geometric modulations over Z and no modulations in the radial direction (for $\nu_M = N \cdot \nu_H$, wherein
      $\nu_M$=moduluation frequency for p and $P_{MW}$
      $\nu_H$=stroke frequency for deposition of the individual layers and wherein, N is a whole number).
    2. periodic profile modulations in axial and radial directions with rotational symmetry (for $\nu_M \neq N \cdot \nu_H$, wherein N is a whole numer)
    3. periodic modulations in the radial direction with rotational symmetry, constant over Z (for $\nu_M << \nu_H$).
  (c) with periodic modulation of the stroke frequency $\nu_H = f(t)$ results in modulations as outlined in (b) 1.–3 above.
  (d) with periodic modulation of the doping gas flow $Q_{Dope} = f(t)$ results in modulations such as outlined in (b) 1.–3 above., except without geometric modulations in b(1).

B. With rotary movement of the substrate tube and previously adjusted deposition asymmetry defined from without (non-central positioning of the substrate tube or fixed temperatured asymmetry $T(\phi)$):
  (a) rotary movement discrete (about fixed angles $\Delta\phi$ per layer and tube position fixed during the deposition of an individual layer) results in:
    1. non-rotationally symmetrical periodic profile modulations in the radial direction, constant over Z (for N. $\Delta\phi = 2\pi$; wherein N is an integer $>3$).
    2. non-rotationally symmetrical elliptical profiles; constant over Z (for $\Delta\phi = \pi$).
  (b) Rotary movement continuous ($\phi = f(\nu_R, t)$: $\nu_R$=rotation frequency) results in:

1. non-rotationally symmetrical radial profile modulations, constant over Z (for $v_R < < v_H$; $v_H$=stroke frequency of deposition of the individual layers).
2. periodic profile modulations in the radial and axial directions (for $v_R$=N. $v_H$ wherein N is an integer) without rotational symmetry.
3. periodic non-rotationally symmetrical profile modulations in the radial direction, not constant over Z (for $v_R \neq$ N. $v_H$ wherein N is an integer).

BRIEF DESCRIPTION OF THE DRAWINGS

The invention will be described in greater detail with reference to the drawing and preferred embodiments.

DETAILED DESCRIPTION OF THE PREFERRED EMBODIMENTS

EXAMPLE 1

Several preforms were manufactured according to the PCVD method and the conditions for rotary movement $\phi(t)$ of the tube and impressed asymmetry of the temperature field $T(\phi)$ were varied in specific manner for each individual preform; all remaining deposition conditions were kept constant, in particular the chronological program process for the chloride gas flows, pressure, temperature and microwave and plasma powers, respectively. The substrate tube had an outside diameter of 18 mm and an inside diameter of 15 mm. The deposition conditions were:

| | |
|---|---|
| stroke length | $\Delta Z_H$ = 40 cm |
| stroke rate of the resonator | $v_H$ = 8 m/min |
| substrate tube temperature | T = 1220° C. |
| pressure | p = 16 hPa |
| plasma power | $P_{MW}$ = 500 W |
| chloride gas flows ($SiCl_4 + GeCl_4$) | $Q_{tot}$ = 120 cm$^3$/min |
| related to standard conditions | (0° C., 1000 hPa) |
| overall deposition duration | $t_{dep}$ = 90 min |
| number of deposited doped layers | $N_{tot}$ = 1000 |

Figure 1:
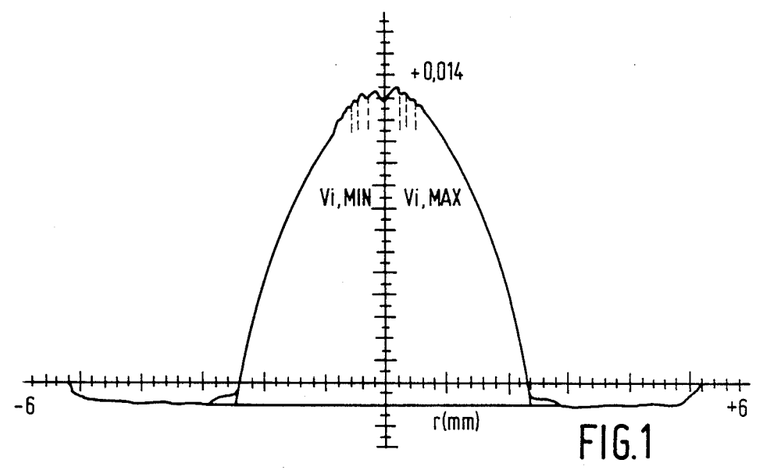
FIGS. 1 to 3 show diagrams of optical refractive index profiles of optical fibres.
Figure 2:
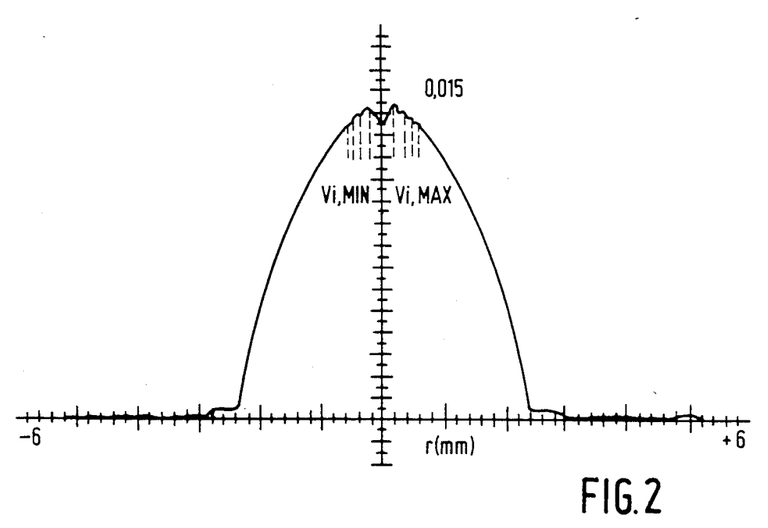
Figure 3:
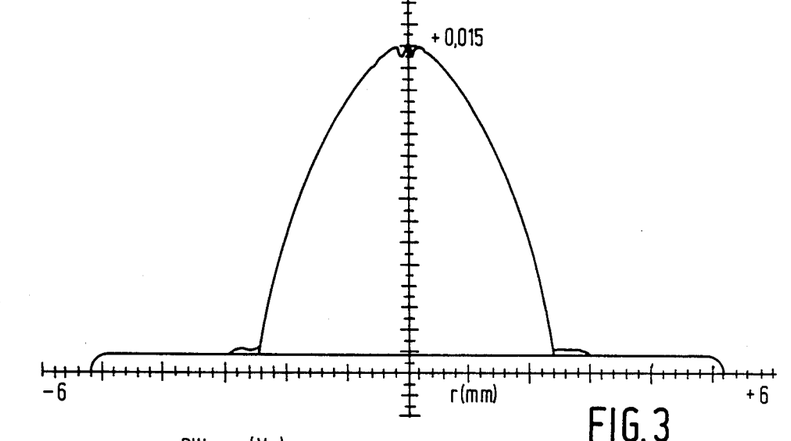

FIGS. 1 to 3 show the optical refractive index profiles which were produced under the following conditions:

(a) FIG. 1: external, simple temperature asymmetry of $\Delta T(\phi) \approx 10°$ C. (T($\phi$ min)=1225° C., T($\phi$ min+$\pi$)=1215° C.) together with a discrete rotary movement of $\Delta\phi$=18° per layer; the overall number of deposited core layers was 1000. The profile modulation resulting therefrom according to B(a) discussed above can clearly be recognized. The decay of the modulation amplitude towards the profile edge is a result of the diffusion mechanism in the collapsing step together with the fact that the radial mass coating in the core increases by $r^2$ (r=radius) and accordingly the spaces between adjacent modulation maxima decrease by r. The profile modulation is non-rotationally symmetrical that is with the same radii a maximum is present on one profile edge. On the other edge, however, each time a minimum is present. The radial cycle length corresponds to the expected one, i.e. with 1000 layers and $\Delta\phi$=18° N=20 and hence there are 50 modulations over the whole core radius.

(b) FIG. 2: the same rotating conditions as in (a) above, but reduced external temperature asymmetry at $\Delta T(\phi) \approx 5°$ C.
With the same radial modulation structure the modulation amplitude is obviously reduced.

(c) FIG. 3: profile without impression of profile modulations. Such a profile should lead to a linear dependence of the propagation time width of an optical pulse on the length, while the profile modulations corresponding to FIGS. 1 and 2 should lead to a dependence with the square root of the length (compare example 2).

EXAMPLE 2

Figure 4:
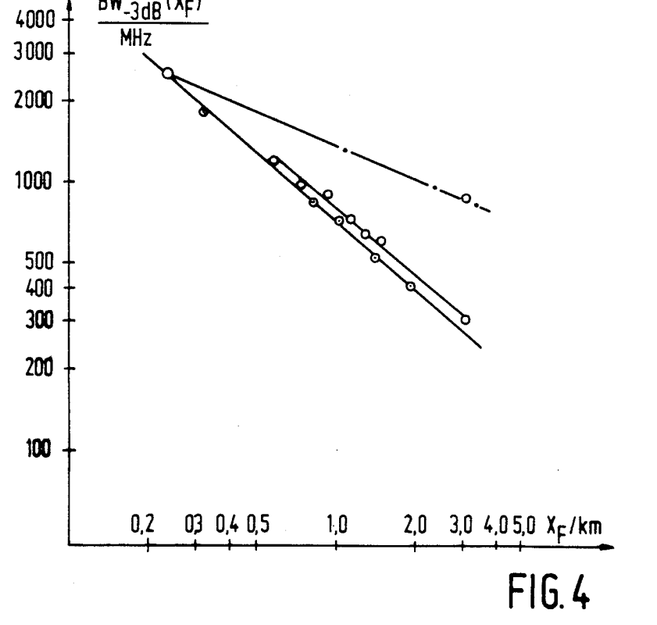
FIG. 4 shows a diagram in which the transmission bandwidth depending on the fibre length is plotted.

Preforms were manufactured according to the PCVD method under identical deposition conditions as in example 1 in which in one case non-rotationally symmetrical, length-constant profile modulations were impressed according to the method of the invention by discrete rotation of $\Delta\phi$=30° per stroke and external temperature asymmetry. FIG. 4 shows that for fibres having such modulations (type 1) the transmission bandwidth decreases by the root of the fibre length. Without such modulations, however, it decreases linearly with the fibre length $x_F$ (type 2). This behaviour corresponds in the selected logarithmic plot of bandwidth BW($x_F$) against fibre length $x_F$ to slopes of the corresponding curves of $\gamma \sim 0.5$ (type 1) and $\gamma \sim 1.0$ type 2). With the same bandwidths of 2.5 GHz over a path length of approximately 250 m the bandwidth of the fibre of type 1 with profile modulations manufactured according to the method of the invention after 3 km path length is already larger by a factor 3 than in the fibre without such profile modulations (BW(3km)$\approx$900 MHz for type 1 and $\approx$300 MHz for type 2).

What is claimed is:

1. A method of manufacturing optical fibers whose refractive index profiles comprise defined peripheral and/or radial and/or axial optical modulation structures which comprises the steps of coating the inside of a glass tube with glass by chemical deposition from the gaseous phase while varying one or more deposition parameters, collapsing the glass tube to form a rod and drawing the rod to form a fiber, wherein
   (1) the internal coating is carried out according to the PCVD method in which method parameters are varied which influence the uniformity of the material transport to the inner wall of the tube and/or the deposition yields of the glass over the circumference of the tube;
   (2) to achieve peripheral optical profile modulations, a specific rotational asymmetry of the external temperature field used for heating the tube is adjusted, the amplitude and number of profile modulations being adjusted over the tube circumference by the amplitude and the number of temperature variations in the external temperature field; and
   (3) elliptical profile structures with polarization-maintaining properties are obtained by adjusting a temperature field which comprises totally two maxima and two minima over the circumference of the tube, adjacent maxima and minima being each time shifted with respect to each other over an angle $\pi/2$.

2. A method of manufacturing optical fibers whose refractive index profiles comprise defined peripheral and/or radial and/or axial optical modulation structures which comprises the steps of coating the inside of a glass tube with glass by chemical deposition from the gaseous phase while varying one or more deposition parameters, collapsing the glass tube to form a rod and drawing the rod to form a fiber, wherein (1) the internal coating is carried out according to the PCVD method in which method parameters are varied which influence the uniformity of the material transport to the inner wall of the tube and/or the deposition yields of the glass over the circumference of the tube;

(2) to achieve peripheral optical profile modulations, a specific rotational asymmetry of the external temperature field used for heating the tube is adjusted, the amplitude and number of profile modulations being adjusted over the tube circumference by the amplitude and the number of temperature variations in the external temperature field; and (3) the position of the peripheral modulation structures is varied in a specific manner over the tube circumference during the deposition by a rotary movement of the tube to be coated, the rotary movement being carried out continuously or in discrete steps in such a manner that the frequency and the cycle time, respectively, and the phase of the rotary movement are correlated in an adjusted manner with the stroke frequency and the cycle, respectively, for the deposition of a single layer and with the phase position, the position of the reactor reciprocating over the tube, different specific correlations between the rotary movement and the stroke movement being adjusted for obtaining different modulation structures; and (4) when the rotary movement is carried out in discrete steps, elliptical, optical and geometrical profile structures are obtained by carrying out said rotary movement of the tube in discrete steps over each time an angle $\pi$ at the reversal points of the moving reactor and the frequency $v_D$ of the discrete rotations is correlated with the stroke frequency $v_H$ of the reactor in accordance with the relationship $v_D = (1/N \cdot v_H)$ wherein N is a positive integer.

3. A method of manufacturing optical fibers whose refractive index profiles comprise defined peripheral and/or radial and/or axial optical modulation structures which comprises the steps of coating the inside of a glass tube with glass by chemical deposition from the gaseous phase while varying one or more deposition parameters, collapsing the glass tube to form a rod and drawing the rod to form a fiber, wherein (1) the internal coating is carried out according to the PCVD method in which method parameters are varied which influence the uniformity of the material transport to the inner wall of the tube and/or the deposition yields of the glass over the circumference of the tube;

(2) in order to reach peripheral optical and geometrical profile modulations, the tube to be coated is provided eccentrically in a specific manner in the reactor producing the plasma, the modulation amplitude being determined by the extent of eccentricity and the number of cycles of the peripheral modulations is one;

(3) the position of the peripheral modulation structures is varied in a specific manner over the tube circumference during the deposition by a rotary movement of the tube to be coated, the rotary movement being carried out continuously or in discrete steps in such a manner that the frequency and the cycle time, respectively, and the phase of the rotary movement are correlated in an adjusted manner with the stroke frequency and the cycle, respectively, for the deposition of a single layer and with the phase position, the position of the reactor reciprocating over the tube, different specific correlations between the rotary movement and the stroke movement being adjusted for obtaining different modulation structures; and (4) when the rotary movement is carried out in discrete steps, elliptical, optical and geometrical profile structures are obtained by carrying out said rotary movement of the tube in discrete steps over each time and angle $\pi$ at the reversal points of the moving reactor and the frequency $v_D$ of the discrete rotations is correlated with the stroke frequency $v_H$ of the reactor in accordance with the relationship $v_D = (1/N \cdot v_H)$ wherein N is a positive integer.

4. A method of manufacturing optical fibers whose refractive index profiles comprise defined peripheral and/or radial and/or axial optical modulation structures which comprises the steps of coating the inside of a glass tube with glass by chemical deposition from the gaseous phase while varying one or more deposition parameters, collapsing the glass tube to form a rod and drawing the rod to form a fiber, wherein (1) the internal coating is carried out according to the PCVD method in which method parameters are varied which influence the uniformity of the material transport to the inner wall of the tube and/or the deposition yields of the glass over the circumference of the tube;

(2) to achieve peripheral optical profile modulations, a specific rotational asymmetry of the external temperature field used for heating the tube is adjusted, the amplitude and number of profile modulations being adjusted over the tube circumference by the amplitude and the number of temperature variations in the external temperature field;

(3) the position of th peripheral modulation structures is varied in a specific manner over the tube circumference during the deposition by a rotary movement of the tube to be coated, the rotary movement being carried out in discrete steps in such a manner that the frequency and the cycle time, respectively, and the phase of the rotary movement are correlated in an adjusted manner with the stroke frequency and the cycle, respectively, for the deposition of a single layer and with the phase position, the position of the reactor reciprocating over the tube, different specific correlations between the rotary movement and the stroke movement being adjusted for obtaining different modulation structures; and (4) for obtaining radial non-rotationally symmetrical helix profile modulations a localized deposition asymmetry is adjusted and the tube is rotated at the reversal points of the moving reactor at each time equal angles $\Delta\phi$ in discrete steps in such a manner that with the same step frequency and stroke frequency the angle of rotation $\Delta\phi$ is chosen in accordance with the relation $\Delta\phi = (2\pi/N)$, where N is an integer $>3$, which in the deposition of totally M individual layers determines the overall number n of the radial periodic profile modulations in accordance with the relationship $n = M/N$.

5. A method of manufacturing optical fibers whose refractive index profiles comprise defined peripheral and/or radial and/or axial optical modulation structures which comprises the steps of coating the inside of a glass tube with glass by chemical deposition from the gaseous phase while varying one or more deposition parameters, collapsing the glass tube to form a rod and drawing the rod to form a fiber, wherein (1) the internal coating is carried out according to the PCVD method in which method parameters are varied which influence the uniformity of the material transport to the inner wall of the tube and/or the deposition yields of the glass over the circumference of the tube;

(2) in order to reach peripheral optical and geometrical profile modulations, the tube to be coated is provided eccentrically in a specific manner in the reactor producing the plasma, the modulation amplitude being determined by the extent of eccentricity and the number of cycles of the peripheral modulations is one;

(3) the position of the peripheral modulation structures is varied in a specific manner over the tube circumference during the deposition by a rotary movement of the tube to be coated, the rotary movement being carried out in discrete steps in such a manner that the frequency and the cycle time, respectively, and the phase of the rotary movement are correlated in an adjusted manner with the stroke frequency and the cycle, respectively, for the deposition of a single layer and with the phase position, the position of the reactor reciprocating over the tube, different specific correlations between the rotary movement and the stroke movement being adjusted for obtaining different modulation structures; and (4) for obtaining radial non-rotationally symmetrical helix profile modulations a localized deposition asymmetry is adjusted and the tube is rotated at the reversal point of the moving reactor at each time equal angles $\Delta\phi$ in discrete steps in such a manner that with the same step frequency and stoke frequency the angle of rotation $\Delta\phi$ is chosen in accordance with the relation $\alpha\phi=2\pi/N$, where N is an integer $>3$, which in the deposition of totally M individual layers determines the overall number n of the radial periodic profile modulations in accordance with the relationship $n=M/N$.

6. A method of manufacturing optical fibers whose refractive index profiles comprise defined peripheral and/or radial and/or axial optical modulation structures which comprises the steps of coating the inside of a glass tube with glass by chemical deposition from the gaseous phase while varying one or more deposition parameters, collapsing the glass tube to form a rod and drawing the rod to form a fiber, wherein (1) the internal coating is carried out according to the PCVD method in which method parameters are varied which influence the uniformity of the material transport to the inner wall of the tube and/or the deposition yields of the glass over the circumference of the tube;

(2) to achieve peripheral optical profile modulations, a specific rotational asymmetry of the external temperature field used for heating the tube is adjusted, the amplitude and number of profile modulations being adjusted over the tube circumference by the amplitude and the number of temperature variations in the external temperature field; and (3) the position of the peripheral modulation structures is varied in a specific manner over the tube circumference during the deposition by a rotary movement of the tube to be coated, the rotary movement being carried out continuously in such a manner that the frequency and the cycle time, respectively, and the phase of the rotary movement are correlated in an adjusted manner with the stroke frequency and the cycle, respectively, for the deposition of a single layer and with the phase position, the position of the reactor reciprocating over the tube, different specific correlations between the rotary movement and the stroke movement being adjusted for obtaining different modulation structures; and (4) for obtaining radial, non-rotationally symmetrical profile modulations varying periodically in the axial direction a peripheral deposition asymmetry is adjusted and the tube is rotated continuously and at a constant rotational frequency $v_R$ in such a manner that the rotational frequency is correlated with the stroke frequency $v_H$ in accordance with the relationship $v_R=(N'+(1/N)v_H$, where N' and N are positive integers in the range $>10$ which, with an overall number of M deposited individual layers, fix the overall number n of the radial periodic profile modulations in accordance with the relation $n=M/N$ and the number of the simultaneous periodic axial profile modulations over the whole deposition length at N'.

7. A method of manufacturing optical fibers whose refractive index profiles comprise defined peripheral and/or radial and/or axial optical modulation structures which comprises the steps of coating the inside of a glass tube with glass by chemical deposition from the gaseous phase while varying one or more deposition parameters, collapsing the glass tube to form a rod and drawing the rod to form a fiber, wherein (1) the internal coating is carried out according to the PCVD method in which method parameters are varied which influence the uniformity of the material transport to the inner wall of the tube and/or the deposition yields of the glass over the circumference of the tube;

(2) in order to reach peripheral optical and geometrical profile modulations, the tube to be coated is provided eccentrically in a specific manner in the reactor producing the plasma, the modulation amplitude being determined by the extent of eccentricity and the number of cycles of the peripheral modulations is one;

(3) the position of the peripheral modulation structures is varied in a specific manner over the tube circumference during the deposition by a rotary movement of the tube to be coated, the rotary movement being carried out continuously in such a manner that the frequency and the cycle time, respectively, and the phase of the rotary movement are correlated in an adjusted manner with the stroke frequency and the cycle, respectively, for the deposition of a single layer and with the phase position, the position of the reactor reciprocating over the tube, different specific correlations between the rotary movement and the stroke movement being adjusted for obtaining different modulation structures; and (4) for obtaining radial, non-rotationally symmetrical profile modulations varying periodically in the axial direction a peripheral deposition asymmetry is adjusted and the tube is rotated continuously and at a constant rotational frequency $v_R$ in such a manner that the rotational frequency is correlated with the stroke frequency $v_H$ in accordance with the relationship $v_R=(N'+(1/N)v_H$ where N' and N are positive integers in the range >10 which, with an overall number of N deposited individual layers, fix the overall number n of the radial periodic profile modulations in accordance with the relation n=M/N and the number of the simultaneous periodic axial profile modulations over the whole deposition length at N'.

8. A method of manufacturing optical fibers whose refractive index profiles comprise defined peripheral and/or radial and/or axial optical modulation structures which comprises the steps of coating the inside of a glass tube with glass by chemical deposition from the gaseous phase, while varying one or more deposition parameters, collapsing the glass tube to form a rod and drawing the rod to form a fiber, and wherein
 (1) the internal coating is carried out according to the PCVD method, in which method those parameters are varied which influence the axial position of the local deposition zone with respect to the device producing the plasma;
 (2) electric microwave power is coupled into the plasma in the reactor area and is temporarily varied periodically;
 (3) the temporarily periodic variation of the microwave power is carried out so that the frequency and the phase position of the modulation of the deposition parameters are correlated in a previously adjusted manner with the stroke frequency and the phase position and the position of the reactor reciprocated over the tube, respectively, in which for achieving various modulation structures various defined correlations are adjusted between modulation frequency of the deposition frequency and the stroke frequency of the reactor; and
 (4) for obtaining rotationally symmetrical profile structures unmodulated in the radial direction and optically and geometrically periodically modulated in the axial direction, the correlation between modulation frequency for the relevant deposition parameters, $v_M$ and stroke frequency $v_H$ for the number of strokes over the tube is adjusted according to the relation $v_M=N'\cdot v_H$ where the phase position of the modulation to the reversal points is shifted by $\pi/2$ against that of the reactor stroke so that there a modulation maximum or minimum occurs and N' is a positive integer simultaneously indicating the number of the periodic axial profile modulations over the whole deposition length.

9. A method of manufacturing optical fibers whose refractive index profiles comprise defined peripheral and/or radial and/or axial optical modulation structures which comprises the steps of coating the inside of a glass tube with glass by chemical deposition from the gaseous phase, while varying one or more deposition parameters, collapsing the glass tube to form a rod and drawing the rod to form a fiber, and wherein
 (1) the internal coating is carried out according to the PCVD method, in which method those parameters are varied which influence the axial position of the local deposition zone with respect to the device producing the plasma;
 (2) electric microwave power is coupled into the plasma in the reactor area and is temporarily varied periodically;
 (3) the temporarily periodic variation of the microwave power is carried out so that the frequency and the phase position of the modulation of the deposition parameters are correlated in a previously adjusted manner with the stroke frequency and the phase position and the position of the reactor reciprocated over the tube, respectively, in which for achieving various modulation structures various defined correlations are adjusted between modulation frequency of the deposition frequency and the stroke frequency of the reactor; and
 (4) for obtaining rotationally symmetrical, radially and axially simultaneously modulated profile structures the correlation between modulation frequency $v_M$ for the relevant deposition parameter and stroke frequency $v_H$ for the number of individual strokes is adjusted according to the relationship $v_M=(N'+(1/N)\cdot v_H$ where N' and N are positive integers in the range >10 which, with a number of M of totally deposited layers, fix the overall number n of the radial periodic profile modulations in accordance with the relationship n=M/N and the number of the simultaneously produced axial profile modulations over the whole deposition length of N'.

10. A method of manufacturing optical fibers whose reflective index profiles comprise defined peripheral and/or radial and/or axial optical modulation structures which comprises the steps of coating the inside of a glass tube with glass by chemical deposition from the gaseous phase, while varying one or more deposition parameters, collapsing the glass tube to form a rod and drawing the rod to form a fiber, and wherein
 (1) the internal coating is carried out according to the PCVD method, in which method those parameters are varied which influence the axial position of the local deposition zone with respect to the device producing the plasma;
 (2) electric microwave power is coupled into the plasma in the reactor area and is temporarily varied periodically;
 (3) the temporarily periodic variation of the microwave power is carried out so that the frequency and the phase position of the modulation of the deposition parameters are correlated in a previously adjusted manner with the stroke frequency and the plasma position and the position of the reactor reciprocated over the tube, respectively, in which for achieving various modulation structures various defined correlations are adjusted between modulation frequency of the deposition frequency and the stroke frequency of the reactor;
 (4) the modulation amplitudes for the deposition parameters are adjusted so that the resulting amplitudes $\Delta Z_{mod}$ of the shift of the local deposition zone with respect to the reactor satisfies the condition $0 < /\Delta Z_{mod}/ < \frac{1}{2}/\Delta Z_p/$ in which $/\Delta Z_p/$ is the path covered by the reactor in the space of a full modulation cycle over the tube and $/\Delta Z_{mod}/$ satisfies the condition $/\Delta Z_{mod}/ = \frac{1}{4}/\Delta Z_p/$; and
 (5) for obtaining rotationally symmetrical profile structures unmodulated in the radial direction and optically and geometrically periodically modulated in the axial direction the correlation between modulation frequency for the relevant deposition parameters, $\nu_M$ and stroke frequency $\nu_H$ for the number of strokes over the tube is adjusted according to the relation $\nu_M = N' \cdot \nu_H$ where the phase position of the modulation to the reversal points is shifted by $\pi/2$ against that of the reactor stroke so that there a modulation maximum or minimum occurs and N' is a positive integer simultaneously indicating the number of the periodic axial profile modulations over the whole deposition length.

11. A method of manufacturing optical fibers whose refractive index profiles comprise defined peripheral and/or radial and/or axial optical modulation structures which comprises the steps of coating the inside of a glass tube with glass by chemical deposition from the gaseous phase, while varying one or more deposition parameters, collapsing the glass tube to form a rod and drawing the rod to form a fiber, and wherein
  (1) the internal coating is carried out according to the PCVD method, in which method those parameters are varied which influence the axial position of the local deposition zone with respect to the device producing the plasma;
  (2) electric microwave power is coupled into the plasma in the reactor area and is temporarily varied periodically;
  (3) the temporarily periodic variation of the microwave power is carried out so that the frequency and the phase position of the modulation of the deposition parameters are correlated in a previously adjusted manner with the stroke frequency and the phase position and the position of the reactor reciprocated over the tube, respectively, in which for achieving various modulation structures various defined correlations are adjusted between modulation frequency of the deposition frequency and the stroke frequency of the reactor;
  (4) the modulation amplitudes for the deposition parameters are adjusted so that the resulting amplitudes $\Delta Z_{mod}$ of the shift of the local deposition zone with respect to the reactor satisfies the condition $0 < /\Delta Z_{mod}/ < \frac{1}{2}/\Delta Z_p/$ in which $/\Delta Z_p/$ is the path covered by the reactor in the space of a full modulation cycle over the tube and $/\Delta Z_{mod}/$ satisfies the condition $/\Delta Z_{mod}/ = \frac{1}{4}/\Delta Z_p/$; and
  (5) for obtaining rotationally symmetrical, radially and axially simultaneously modulated profile structures the correlation between modulation frequency $\nu_M$ for the relevant deposition parameter and stroke frequency $\nu_H$ for the number of individual strokes is adjusted according to the relationship $\nu_M = (N' + (1/N) \cdot \nu_H$ where N' and N are positive integers in the range > 10 which, with a number M of totally deposited layers, fix the overall number n of the radial periodic profile modulations in accordance with the relationship n = M/N and the number of the simultaneously produced axial profile modulations over the whole deposition length at N'.

12. A method of manufacturing optical fibers whose refractive index profiles comprise defined peripheral and/or radial and/or axial optical modulation structures which comprises the steps of coating the inside of a glass tube with glass by chemical deposition from the gaseous phase, while varying one or more deposition parameters, collapsing the glass tube to form a rod and drawing the rod to form a fiber, and wherein
  (1) the internal coating is carried out according to the PCVD method, in which method those parameters are varied which influence the axial position of the local deposition zone with respect to the device producing the plasma; and
  (2) periodic variation of one or more of the indicated deposition parameters is carried out so that the frequency and the phase position of the modulation of the deposition parameters are correlated in a previously adjusted manner with the stroke frequency and the phase position and the position of the reactor reciprocated over the tube, respectively, in which for achieving various modulation structures various defined correlations are adjusted between modulation frequency of the deposition frequency and the stroke frequency of the reactor.

13. A method of manufacturing optical fibers whose refractive index profiles comprise defined peripheral and/or radial and/or axial optical modulation structures which comprises the steps of coating the inside of a glass tube with glass by chemical deposition from the gaseous phase while varying one or more deposition parameters, collapsing the glass tube to form a rod and drawing the rod to form a fiber, wherein
  (1) the internal coating is carried out according to the PCVD method in which method parameters are varied which influence the uniformity of the material transport to the inner wall of the tube and/or the deposition yields of the glass over the circumference of the tube; and
  (2) periodic variation of one or more of the indicated deposition parameters is carried out so that the frequency and the phase position of the modulation of the deposition parameters are correlated in a previously adjusted manner with the stroke frequency and the phase position and the position of the reactor reciprocated over the tube, respectively, in which for achieving various modulation structures various defined correlations are adjusted between modulation frequency of the deposition frequency and the stroke frequency of the reactor.

14. A method of manufacturing optical fibers whose refractive index profiles comprise defined peripheral and/or radial and/or axial optical modulation structures which comprises the steps of coating the inside of a glass tube with glass by chemical deposition from the gaseous phase while varying a combination of deposition parameters, collapsing the glass tube to form a rod and drawing the rod to form a fiber, wherein the internal coating is carried out according to the PCVD method in which method (a) parameters are varied which influence the uniformity of the material transport to the inner wall of the tube and/or the deposition yields of the glass over the circumference of the tube and/or (b) those parameters are varied which influence the axial position of the local deposition zone with respect to the device producing the plasma and wherein said combination of parameters comprise combinations of the following steps of
  (a) adjusting a specific rotational asymmetry of the external temperature field used for heating the tube;
  (b) providing the tube to be coated eccentrically in the reactor producing the plasma,
  (c) rotary movement of the tube to be coated continuously or in discrete steps;

(d) adjusting the asymmetry of a localized deposition and rotating the tube in discrete steps at the reversal points of the moving reactor;

(e) adjusting the peripheral deposition asymmetry and rotating the tube continuously and at a constant rotational frequency;

(f) periodically varying one or more of the electric microwave power, the pressure in the tube, the stroke velocity of the reactor reciprocated over the tube, the oxygen carrier gas flux, and the reactive gas flows;

(g) adjusting the ratio of rotational frequency to stroke frequency;

(h) adjusting the ratio of modulation frequency to stroke frequency;

(i) adjusting the modulation frequency to be an integer multiple of the stroke frequency; and (j) adjusting the modulation frequency to be more or less than a whole multiple of the stroke frequency.

15. A method of manufacturing optical fibers whose refractive index profiles comprise defined peripheral and/or radial and/or axial optical modulation structures which comprises the steps of coating the inside of a glass tube with glass by chemical deposition from the gaseous phase, while varying one or more deposition parameters, collapsing the glass tube to form a rod and drawing the rod to form a fiber, and wherein (1) the internal coating is carried out according to the PCVD method, in which method those parameters are varied which influence the axial position of the local deposition zone with respect to the device producing the plasma;

(2) electric microwave power is coupled into the plasma in the reactor area and is temporarily varied periodically;

(3) the temporarily periodic variation of the microwave power is carried out so that the frequency and the phase position of the modulation of the deposition parameters are correlated in a previously adjusted manner with the stroke frequency and the phase position and the position of the reactor reciprocated over the tube, respectively, in which for achieving various modulation structures various defined correlations are adjusted between modulation frequency of the deposition frequency and the stroke frequency of the reactor and (4) the modulation amplitudes for the deposition parameters are adjusted so that the resulting amplitudes $\Delta Z_{mod}$ of the shift of the local deposition zone with respect to the reactor satisfies the condition $0 < /\Delta Z_{mod}/ < \frac{1}{2} < /\Delta Z_p/$ in which $/\Delta Z_p/$ is the path covered by the reactor in the space of a full modulation cycle over the tube and $/\Delta Z_{mod}/$ satisfies the condition $/\Delta Z_{mod}/ = \frac{1}{4}/\Delta Z_p/$.

* * * * *